No. 717,730. PATENTED JAN. 6, 1903.
N. WINDSOR.
CONTROLLING MECHANISM FOR VENEER DRIERS.
APPLICATION FILED JAN. 24, 1902.
NO MODEL. 3 SHEETS—SHEET 1.

WITNESSES:
F. B. Townsend
N. W. Munday

INVENTOR.
Nelson Windsor.
BY Munday, Evarts & Adcock
ATTORNEYS

No. 717,730. PATENTED JAN. 6, 1903.
N. WINDSOR.
CONTROLLING MECHANISM FOR VENEER DRIERS.
APPLICATION FILED JAN. 24, 1902.
NO MODEL. 3 SHEETS—SHEET 3.
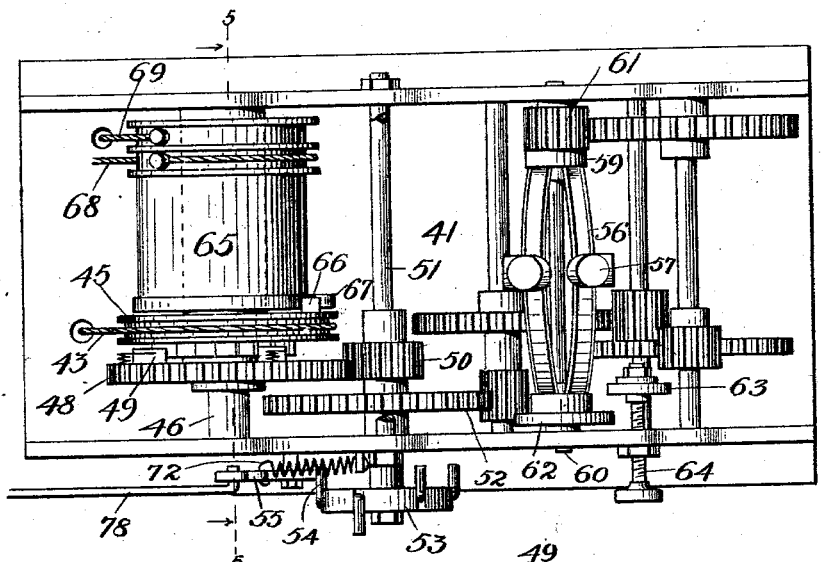
Fig. 4.
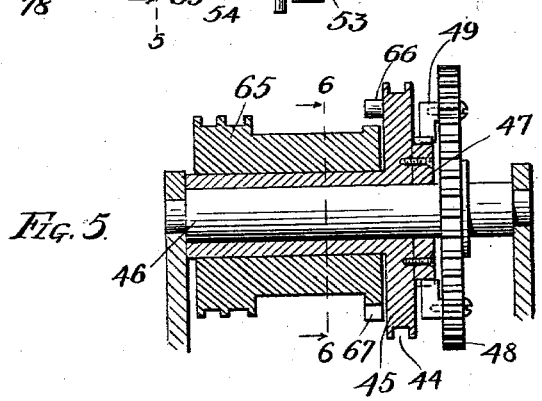
Fig. 5.
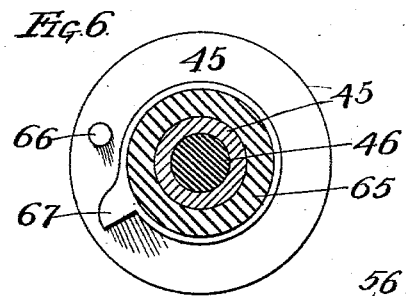
Fig. 6.
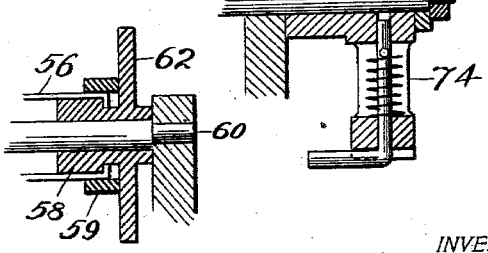
Fig. 7.
Fig. 8.
WITNESSES:
F. B. Townsend
N. W. Munday
INVENTOR.
Nelson Windsor
BY Munday, Evarts & Adcock
ATTORNEYS

UNITED STATES PATENT OFFICE.

NELSON WINDSOR, OF POPLARBLUFF, MISSOURI, ASSIGNOR TO AARON S. NICHOLS, OF CHICAGO, ILLINOIS.

CONTROLLING MECHANISM FOR VENEER-DRIERS.

SPECIFICATION forming part of Letters Patent No. 717,730, dated January 6, 1903.

Application filed January 24, 1902. Serial No. 91,026. (No model.)

*To all whom it may concern:*

Be it known that I, NELSON WINDSOR, a subject of the King of Great Britain, residing in Poplarbluff, in the county of Butler and State of Missouri, have invented a new and useful Improvement in Controlling Mechanism for Veneer-Driers, of which the following is a specification.

This invention relates to the means employed to control the opening and closing of the platens of veneer-driers and is an improvement upon the means heretofore used for that purpose.

The nature of the invention and its method of operation are set forth in the description given below and will be fully understood from such description when considered in connection with the accompanying drawings, in which—

Figure 1:
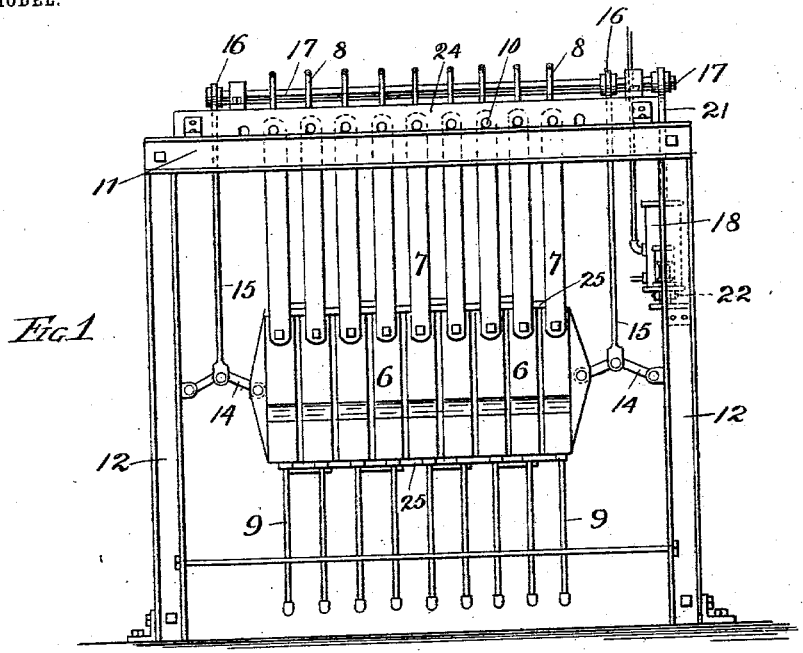
Figure 2:
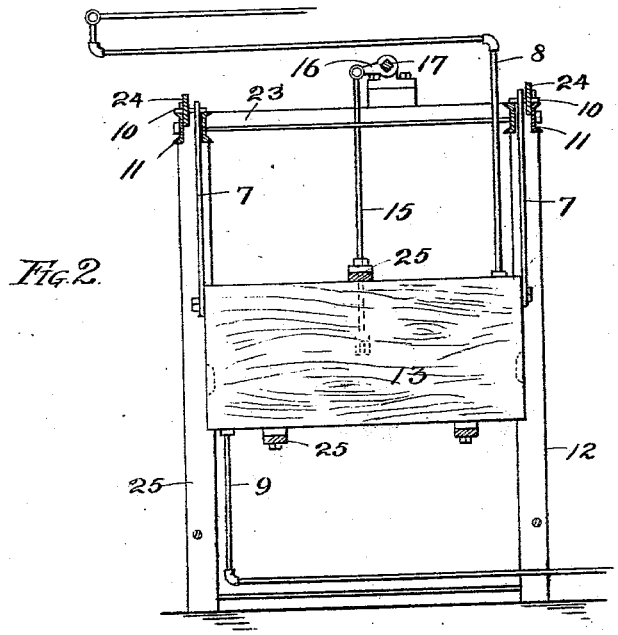
Figure 3:
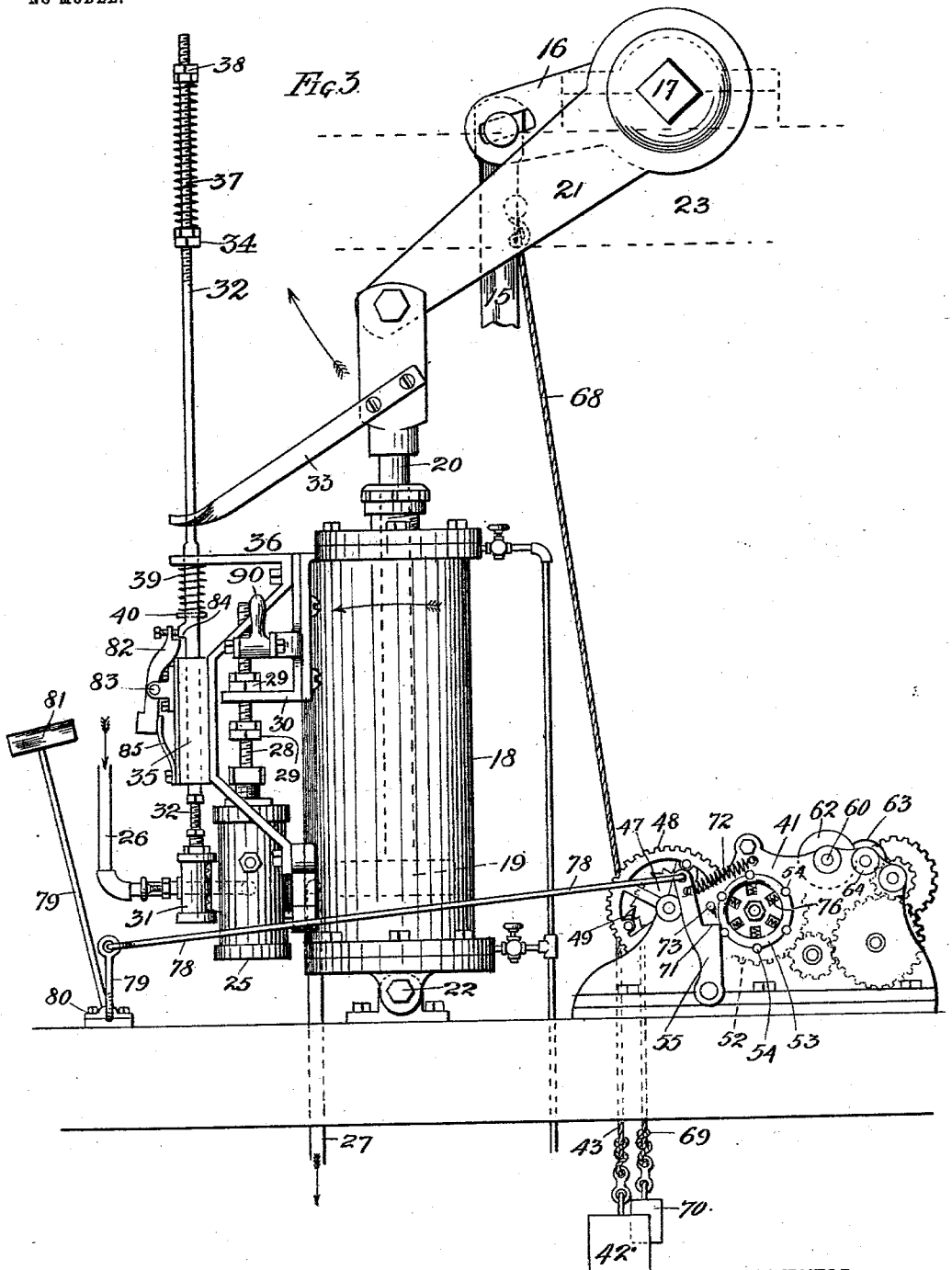

Figure 1 is a front elevation, and Fig. 2 a transverse vertical section, of a drier embodying my invention. Fig. 3 is a partial end elevation. Fig. 4 is a plan, partly broken away, of the time-movement. Fig. 5 is a section on the line 5 5 of Fig. 4. Fig. 6 is a section on the line 6 6 of Fig. 5. Figs. 7 and 8 are detail sections.

In said drawings, 6 6 represent the platens of the drier flexibly joined to supporting-bars 7 7 and heated internally by steam admitted through pipes 8. The condensations are conducted away by pipes 9. The hanger-bars are pivoted at their upper ends on pins 10, resting on beams 11, supported at their ends by corner-posts 12.

The platens are adapted to receive the veneers 13 between them and are forced into close contact with them by toggles 14 at each end of the series of platens. The toggles are extended and contracted by rods 15, attached to cranks 16 on the rock-shaft 17 by any suitable means. I have shown for this purpose a steam-cylinder 18, having a piston 19, the stem 20 of which is joined to a crank 21 on the shaft, the cylinder being pivotally supported at 22 to permit the slight changes in position rendered necessary by the direct attachment of the stem to the crank. Shaft 17 is supported on cross-beams 23, and the pivots 10 are held in their proper positions by notched spacing-bars 24. Said cylinder is supplied with steam through a valve-cylinder 25, connected to the steam-supply pipe 26, and exhausts through pipe 27. The valve in cylinder 25 controls the admission of steam to the power-cylinder 18, and its stem is shown at 28, and its movements are regulated by the set-nuts 29 on the stem at each side of a stationary bracket 30. The control of the valve of cylinder 25 is effected by a piston-valve in cylinder 31, the stem 32 of which is quite extended in order that it may be operated by an arm 33, attached to the piston-stem 20, as shown, and adapted to engage the adjustable nut 34, threaded on stem 32, when the piston 19 moves to its other position. The piston is shown at Fig. 3 in the position occupied when extending the toggles and effecting the pressure on the veneers. The stem 32 passes through a long guide 35 and also through an arm 36, as shown, and is provided with a spring 37 between nut 34 and another nut 38 above it to prevent the former from turning under the impacts of the arm 33. The stem is also provided with a spring 39 below bracket-arm 36 and above a pin 40, passing through the stem, so that said spring 39 will tend to press the stem downward. I do not illustrate the valves, as I am not claiming them in this case, and their construction is well understood, and, moreover, they are shown in the application, Serial No. 79,786, filed by A. S. Nichols on October 24, 1901. It is sufficient to say that through the valve of cylinder 31 the piston 19 is caused both to act and to cease from acting, or, in other words, it is caused to rock shaft 17 in both directions. Both cylinders 25 and 31 are supported from the main cylinder, as are also guide 35 and arm 36.

The time-movement, by which the opening and closing of the platens is caused to take place at proper intervals, is shown at 41. It is provided with a motor-weight 42, the cord or chain 43 of which winds up in the channel 44 of drum 45, loose on shaft 46. Attached to the drum is a ratchet-wheel 47, and fast on the same shaft is a gear 48, carrying one or more pawls 49, adapted to engage said wheel 47 when moved in one direction and to ride idly over the same in the opposite direction. Gear 48 meshes with a small gear 50 on shaft 51, carrying a large gear 52 and also carrying a regulator 53, provided with laterally-projecting pins 54, adapted to actuate a pivoted lever 55, the function of which lever is explained later on.

The time-movement is provided with a suitable governor, and I show a desirable construction therefor. It consists of a series of longitudinal springs 56, each provided at its center with a weight 57 and having its ends bent at right angles and confined between shouldered hubs 58 and surrounding sleeves 59 on the governor-shaft 60. (See Fig. 8.) The governor-shaft carries a gear 61, receiving power through the train of gears shown from gear 52. The hubs 58 and sleeves 59 are free to move on the shaft 60 to permit the outward bowing of the center or weighted portions of the springs. The governing-shaft carries a disk 62, and at 63 is a stationary but adjustable disk mounted on the end of screw 64, passing through the side plate of the time-movement. The disk 63 is intended to be positioned where it will contact with disk 62 and prevent the governor-springs from bowing out too much, thereby controlling the speed of the mechanism. The disk 62 is desirably made in one piece with one of the hubs 58.

Surrounding the hub or sleeve portion of drum 45 is a second drum 65, which is not compelled to move with said drum 45 except when the pin 66, carried by and projecting from the side of the enlarged portion of drum 45, encounters the abrupt side of a projection 67 on the drum 65. (See Figs. 5 and 6.) On the drum is wound a rewinding cord or chain 68, the end of which is carried up and attached to crank 21, and also another cord 69, which passes downward and supports a weight 70, having sufficient gravity to keep the cord 68 taut.

The lever 55 is offset at 71 and is urged toward the regulator 53 by a spring 72. A stop 73 limits the movement caused by the spring. The pins 54 on the regulator encounter the side of the lever below the offset as they approach it from the under side of the regulator and force it back, so as strain the spring. Each pin acts thus until it has reached the offset, when the spring is permitted to throw the lever back against the stop 73. The pins 54 are employed in such number and at such distances apart as will enable them to move the lever 55 in the manner described at the times desired for the quick momentary opening of the platens for the escape of the moisture driven out of the veneers by the heat. The regulator is desirably, though not necessarily, constructed as shown. It consists of a wheel having openings 74 in its web and also radial holes in its rim and hub, so that the right-angle stems 75 of the pins 54 may be inserted in the radial holes and have encircling springs 76 secured on them within the openings 74, the springs acting to keep the pins in the cross-slots 77, formed for them on the rim of the wheel. Whenever it is desired to put any pin out of service, and thus to lengthen the interval between the opening movements of the platens, it is only necessary to lift it clear of its slot 77 and turn it around, so it will project from the back side of the regulator and allow it to drop back into its slot again. One of the pins is shown as thus reversed in Fig. 4, and one is so shown in Fig. 7.

The lever 55 is connected by a rod 78 with one arm of U-shaped frame 79, pivoted at 80 and carrying on its other arm a hammer or weight 81. When the lever 55 is released from the pins 54 and is impelled by its spring, it acts through the rod 78 to force the hammer against one end of a latch 82, pivoted at its center, as at 83, and engaging at its upper end a shoulder 84 on the valve-stem 32 and overcomes the spring 85, by which the latch is thrown into its acting position and releases the valve-stem, so that it is then free to descend under the power of spring 39 and carry the controlling-valve in cylinder 31 into such position as will cause the rising of the piston 19 and the opening of the platens. The upward movement of piston 19, however, quickly causes a closing of the platens, because the arm 33 at the conclusion of the upward movement raises stem 32, so that the latch again enters under shoulder 84, and also moves the valve of cylinder 31 back, so that the piston 19 will be returned to the position of Fig. 3.

It will be noted from the description already given that when the crank 21 is raised at each time of opening the platens cord 68 will be drawn up and caused to unwind from drum 65, thereby turning said drum and causing it when its projection 67 encounters pin 66 to turn drum 45 and wind up cord 43. In this manner the power-weight 42 is wound up as often as it unwinds and to the same extent each time, so that the power for driving the regulator is always present when needed and requires no attention whatever from the attendant.

A hand-lever 90 is connected to the stem 28 and enables the starting of the stem in case it sticks.

I claim—

1. The opening and closing veneer-drier, the controlling mechanism whereof embraces a time-movement having a motor-weight, a drum winding up such weight and having a ratchet connection to the shaft of the drum, a second drum loosely mounted on the first-mentioned drum, a flexible connection from said second drum to the rewinding device, and a weight connected to said second drum by a cord and acting to keep the connection to the rewinding device in a taut condition, substantially as specified.

2. The controlling mechanism for veneer-driers embracing a time-movement having a motor-drum and having a ratchet connection to its supporting-shaft, a rewinding-drum loosely mounted on the first-mentioned drum, interlocking devices on said drums whereby the rewinding-drum actuates the motor-drum during the rewinding, and means for actuating the rewinding-drum, substantially as specified.

3. The controlling mechanism for veneer-driers embracing a time-movement having a motor-drum and having a ratchet connection to its supporting-shaft, a rewinding-drum loosely mounted on the first-mentioned drum, interlocking devices on said drums whereby the rewinding-drum actuates the motor-drum during the rewinding, and a connection from said rewinding-drum to the power mechanism of the drier whereby the operating of the drier will cause the rewinding of the time-movement, substantially as specified.

4. The combination in a time-movement of a motor-drum communicating power to its shaft, a rewinding-drum loosely mounted on the sleeve of the motor-drum, interlocking devices whereby the rewinding-drum may actuate the other drum in winding up, and means for actuating the rewinding-drum, substantially as specified.

5. The combination in a time-movement of a motor-drum communicating power to its shaft, a rewinding-drum loosely mounted on the sleeve of the motor-drum, interlocking devices whereby the rewinding-drum may actuate the other drum in winding up, a power device actuating said rewinding-drum in rewinding, a flexible connection between the rewinding-drum and said power device, and a weight and cord attached to said rewinding-drum and acting to keep said flexible connection to the source of power in a taut condition, substantially as specified.

6. A time-movement having a motor-drum and weight, a second drum for winding up the motor-drum, a power device such as 21, a flexible connection from said power device to said second drum winding on the latter, and a weight and cord attached to said second drum and acting to keep said flexible connection taut, substantially as specified.

7. A time-movement having a motor-drum and a rewinding-drum, the latter being loosely mounted on the former and engaging therewith during the rewinding, substantially as specified.

NELSON WINDSOR.

Witnesses:
ELIJAH WINDSOR,
CHAS. E. LENTZ.